United States Patent Office 3,600,424
Patented Aug. 17, 1971

3,600,424
PROCESS FOR THE PURIFICATION OF NITRILES
Charles Laviron and Michel Schmidgen, Saint-Avold, France, assignors to Ugine Kuhlmann, Paris, France
No Drawing. Filed Aug. 15, 1967, Ser. No. 660,578
Claims priority, application France, Aug. 26, 1966, 74,295
Int. Cl. C07c 121/30, 121/18
U.S. Cl. 260—465.3
4 Claims

ABSTRACT OF THE DISCLOSURE

A process for purifying nitrile-containing compositions, particularly compositions containing hydrocyanic acid or nitriles such as acrylonitrile. The process involves freeing the nitriles of epoxide impurities by converting the latter to the corresponding glycols by hydration in the presence of acids. The nitriles are then distilled to leave the glycols as tail products.

---

This invention is concerned with a process for the purification of compositions containing nitriles; more specifically hydrocyanic acid or organo nitriles. Such compositions are produced, for example, by the catalytic oxidation of ethylenic hydrocarbons in the vapor phase with oxygen or air in the presence of ammonia. In accordance with the process of the invention the compositions are purified by conversion of epoxide impurities coformed in the course of the reaction to the corresponding glycols by the reaction with water in the presence of an acid catalyst.

In the industrial preparation of nitriles, such as hydrocyanic acid, acrylonitrile or methacrylonitrile from hydrocarbons by ammoxidation by reaction with oxygen or an oxygen-containing gas in the presence of ammonia, compounds possessing the epoxide function are formed. Typical hydrocarbons utilized in such reactions include unsaturated hydrocarbons containing up to 4 carbon atoms and these include, for example, ethylene, propylene, butene-1, butene-2, isobutene, butadiene, and the like. These are converted in the course of the reaction so that undesirable quantities of epoxides such as ethylene oxide, propylene oxide, and isobutylene oxide are present in the desired products. These epoxides while normally they are present only in relatively low concentration, nevertheless seriously affect the quality of the nitriles and the products derived from them.

The epoxides are not readily removed by distillation because the boiling point of the epoxides is often very close to the boiling point of the nitriles to be prepared. The separation of propylene oxide and hydrocyanic acid is theoretically possible by fractional distillation provided that sufficiently efficient distillation columns are employed in association with high reflux ratios. However, it has been found that in the course of the distillation significantly large quantities of polymerized products formed by polymerization of the nitriles are produced. Accordingly it has often been necessary to tolerate appreciable quantities of epoxide compounds rather than to accept the losses resulting from the distillation.

In accordance with the present invention the epoxide compounds contained in the nitrile compositions produced by the oxidation of hydrocarbons such as described above in the presence of ammonia are converted to glycols by hydration in the presence of an acid catalyst. The hydration is carried out in the original nitrile composition by adding the appropriate reagents and carrying out the reaction. At the end of the reaction period the mixture may be purified, for example, by distillation to separate the nitriles from the glycols. It is most convenient to effect separation by ordinary distillation so that the nitriles are removed as an overhead fraction and the glycols remain behind as a tail product.

Since the glycols produced by hydration reaction have very high boiling points compared with the boiling points of the nitriles, separation may be effected quite readily. In fact, the separation may be effected using a low efficiency column at very moderate reflux ratios so as to obtain nitriles which are substantially free of the original epoxide compounds.

The importance of the process of this invention may be understood when one compares the boiling points of the epoxides, the nitriles which are to be purified, and the glycols produced by hydration of the epoxides. Thus, for example, at atmospheric pressure, the boiling points of a number of representative compounds are as follows:

|  | ° C. |
|---|---|
| Ethylene oxide | 10.7 |
| 1,2-propylene oxide | 34.5 |
| Isobutylene oxide | 52.4 |
| Hydrogen cyanide | 27 |
| Acrylonitrile | 77 |
| Acetonitrile | 81 |
| Ethylene glycol | 240 |
| Propylene glycol | 188–189 |
| Diethylene glycol | 245 |
| Isobutylene glycol | 179 |

The concentrations of epoxides normally encountered in the ammoxidation process may range from a few parts per million to approximately 5%, based on the weight of nitrile, and is customarily on the order of 1%.

Any of a number of organic or inorganic acids may be used to bring about the required catalytic concentration of hydrogen ions to effect catalysis. In practice the mixture to be purified is acidified to a sufficient extent so as to supply 1 to 500 milliequivalents of acid hydrogen per litre of composition. If the pH of the medium can be measured it is best to maintain this pH in the range between 1 and 4.5, preferably between 1 and 3. Strong mineral or organic acids are preferred as acid catalysts. These may include, for example, hydrochloric acid, sulphuric acid, toluene sulfonic acid or ion exchange resins such as sulfonic or phosphonic acid resins based on polystyrene. Less dissociatable acids may also be employed, however, and these may include such acids as picric acid, oxalic acid, phosphoric acid and acetic acid. A particular advantage of the utiliztion of these weaker acids is that they are less corrosive of the equipment and their utilization is not associated with a high risk of polymerization of the nitriles, especially in the case of hydrocyanic acid.

A stoichiometric excess of water based on the epoxide to be hydrated is employed to obtain the best results. The excess of water allows maximum ionization of the acid. In the case of propylene oxide it has been observed that even with a molar ratio of water/epoxide which is equal to 3, the hydration reaction is still possible if the initial mixture is sufficiently acidified, even though the rate is somewhat slower.

The rate of the hydration reaction increases with temperature and with decreasing pH. Normally the rate is such that the reaction is completed within a period of from about ten minutes to six hours. It has been found, for example, that at a temperature of 30° C. and an initial concentration of approximately 1%, by weight, propylene oxide is substantially totally converted to the corresponding glycol during a period of six hours at a pH of 2.4. Two hours is required at pH 1.7, 45 minutes at pH 1.3, and 20 minutes at pH 1.15. If the temperature is increased to 50° C. only one hour is required for substantially total conversion at pH 2.4. At this same pH, conversion is substantially complete at the end of 15 minutes at a temperature of 80° C.

Normally the hydration is carried out at a temperature of from about 10° C. to 100° C. The preferred range from the point of view of efficiency and economy of operation is from 25° C. to 80° C.

The process of the invention can be illustrated by the following non-limiting examples in which hydrocyanic acid, acrylonitrile and acetonitrile obtained from propylene ammonia and air by catalytic reaction in the vapor phase and containing approximately 1 to 5% by weight of 1,2-propylene oxide, is purified.

EXAMPLE 1

This example illustrates the usual distillation procedure used with technical hydrocyanic acid.

Technical grade hydrocyanic acid was supplied, containing 1% of propylene oxide and 1% of water as determined by chromatographic analysis in gas phase and approximately 98% of hydrocyanic acid.

This acid was distilled in a glass laboratory column of 20 mm. diameter, 1 m. height, packed with glass rings, equipped with a head fitted with a condenser, a cooler and a solenoid valve operated by a time mechanism; the reflux ratio was therefore well controlled and constant. The heating of the bottom flask was carried out by an electric heater.

The efficiency of this column, verified by the customary method of total reflux was approximately 5 theoretical plates.

At a reflux ratio of 85%, approximately 90% of the hydrocyanic acid of the starting stock were distilled. The distillate contained 100 p.p.m. of propylene oxide.

EXAMPLE 2

A sufficient quantity of phosphoric acid was added to the technical hydrocyanic acid of Example 1 to produce a mixture having the following composition:

| | Percent |
|---|---|
| HCN (approximately) | 91 |
| Propylene oxide | 0.92 |
| Water | 4.6 |
| Phosphoric acid | 3.4 |

347 millimoles of phosphoric acid were present per litre of mixture to be purified and, counting only the primary acidity of phosphoric acid, 347 milliequivalents of acid hydrogen.

The mixture was maintained under total reflux for 8 hours at a temperature in the flask of approximately 30° C. After this time chromatographic analysis showed that all the propylene oxide had disappeared. A peak of propylene glycol was found which represented approximately 1.2% by weight. The mixture was distilled in a Vigreux points column of an efficiency of the order of 1 theoretical plate, with a reflux ratio of zero. The distillate which represented 85% of the starting charge did not contain any propylene oxide.

EXAMPLE 3

An aqueous solution of technical hydrocyanic acid was supplied containing 20% of HCN and 0.2% of propylene oxide. The pH was approximately 5.

With the object of setting up a reference experiment this solution was distilled directly in a column identical with that described in Example 1, and with the same reflux ratio control. Approximately 90% of the HCN contained in the flask were distilled. The distillate contained 100 p.p.m. of propylene oxide. As the distillation is continued, the propylene oxide content of the distillate rises very rapidly.

To this same starting solution 0.05% of phosphoric acid in a concentration of 85% was added. The amount of phosphoric acid per litre rose to 4.3 millimoles. The pH of the solution was then 2.4 and the true number of hydrogen ions 4 milliequivalents per litre.

The mixture was heated to near boiling at 45° C., with total reflux, for one hour and then distilled. 99% of the HCN contained in the starting solution were recovered. The chromatographic analysis showed the distillate to have a propylene oxide content of zero.

EXAMPLE 4

An aqueous solution of acetonitrile was supplied containing, by weight, 5% of acetonitrile and 0.2% of propylene oxide.

At 30° C., 0.8% of paratoluene sulphonic acid was added. The pH of the resulting solution was 1.3.

It was found that the propylene oxide disappeared very rapidly, as is shown by the following table:

| Time after addition of acid, minutes: | Efficiency of removal, percent |
|---|---|
| 6 | 74 |
| 15 | 96.35 |
| 30 | 99.7 |
| 45 | 99.95 |
| 60 | 100 |

The distillation of this dilute solution of acetonitrile gave an acetonitrile substantially free of propylene oxide.

EXAMPLE 5

In the course of the manufacture of acrylonitrile from propylene, ammonia and air, a dilute solution of acrylonitrile in water was obtained containing approximately 3% of acrylonitrile and 100 p.p.m. of propylene oxide.

This solution was acidified with 0.08% of paratoluene sulphonic acid. The pH of the resulting solution was 2.35.

After 15 minutes of heating to 50° C. only 25 p.p.m. of propylene oxide remained.

After 60 minutes of heating to 50° C. no more propylene oxide could be detected by flame ionization.

What is claimed is:

1. In the process of preparing cyano compounds by ammoxidation of a material selected from the group consisting of propylene, butene-1, butene-2, isobutene and butadiene to provide a product containing up to five percent by weight, based on said cyano compounds, of by-product epoxides, the improvement which comprises reacting the epoxides in said product with a stoichiometric excess of water in the presence of a concentration of an acid catalyst to supply from one to 500 milliequivalents of acid hydrogen per liter, at a temperature of from about 10° C. to 100° C. for a period of from about ten minutes to six hours to convert the epoxides to the corresponding glycols and thereafter distilling the reaction mixture to collect the purified cyano compounds as a distillate.

2. A process as in claim 1 in which the material is propylene and the product contains hydrocyanic acid, acrylonitrile, and acetonitrile.

3. A process as in claim 1 wherein the acid is phosphoric acid.

4. A process as in claim 1 wherein the acid is para toluene sulphonic acid.

References Cited

UNITED STATES PATENTS

| 3,219,685 | 11/1965 | Roelen et al. | 260—465.9X |
| 3,257,445 | 6/1966 | Roelen et al. | 260—465.9X |
| 3,262,963 | 7/1966 | Modiano et al. | 260—465.9 |

OTHER REFERENCES

Noller: "Chemistry of Organic Compounds," 2nd Ed., 1957, p. 740.

JOSEPH PAUL BRUST, Primary Examiner

U.S. Cl. X.R.

203—34